US006083316A

United States Patent [19]

Bastow

[11] Patent Number: 6,083,316

[45] Date of Patent: Jul. 4, 2000

[54] SURFACE DEFECT DETECTION POWDER COMPOSITION, METHODS OF USING SAME AND APPLICATION THEREFOR

[75] Inventor: David R. Bastow, Tamworth, United Kingdom

[73] Assignee: 3M Innovative Properties Company, St. Paul, Minn.

[21] Appl. No.: 08/976,874

[22] Filed: Nov. 24, 1997

Related U.S. Application Data

[62] Division of application No. 08/542,555, Oct. 13, 1995, Pat. No. 5,721,011.

[51] Int. Cl.[7] .............................. C04B 14/00; C09C 1/24; C09C 1/04; C08K 5/098

[52] U.S. Cl. .......................... 106/419; 106/431; 106/457; 106/459; 106/460; 106/461; 106/464; 106/465; 106/505

[58] Field of Search .................................... 428/323, 328, 428/329; 106/816, 712, 801, 802, 286.1, 286.8, 287.18, 287.24, 419, 429, 457, 459, 460, 461, 464, 465, 505, 431

[56] References Cited

U.S. PATENT DOCUMENTS

| | | | |
|---|---|---|---|
| 3,928,655 | 12/1975 | Iwasa et al. | 427/21 |
| 3,941,315 | 3/1976 | Gribble et al. | 241/3 |
| 4,351,640 | 9/1982 | Schaffer et al. | 8/524 |
| 4,661,369 | 4/1987 | Crane | 427/8 |
| 4,731,290 | 3/1988 | Chang | 428/335 |
| 5,332,523 | 7/1994 | Igarashi et al. | 252/309 |
| 5,356,957 | 10/1994 | Nanri et al. | 523/218 |
| 5,458,973 | 10/1995 | Jeffs | 428/402 |
| 5,621,023 | 4/1997 | Nishimura et al. | 523/200 |
| 5,646,198 | 7/1997 | Tanaka et al. | 523/122 |
| 5,698,628 | 12/1997 | Masuda et al. | 524/806 |
| 5,726,225 | 3/1998 | Braig et al. | 524/83 |
| 5,733,365 | 3/1998 | Halko et al. | 106/437 |
| 5,853,467 | 12/1998 | Ostlie | 106/31.28 |
| 5,922,398 | 7/1999 | Hermes et al. | 427/137 |

FOREIGN PATENT DOCUMENTS

| | | |
|---|---|---|
| 0 022 489 | 1/1981 | European Pat. Off. . |
| 0 257 304 | 3/1988 | European Pat. Off. . |
| 37 12 733 | 11/1988 | Germany . |
| 61-022238 | 1/1986 | Japan . |
| 63-304153 | 12/1988 | Japan . |
| 1 819 873 | 6/1993 | U.S.S.R. . |
| 2 183 666 | 6/1987 | United Kingdom . |
| 2 226 017 | 6/1990 | United Kingdom . |
| WO 95/08405 | 3/1995 | WIPO . |

*Primary Examiner*—Hoa T. Le
*Attorney, Agent, or Firm*—Scott R. Pribnow

[57] ABSTRACT

An adhesive-free, dry, free-flowing powder composition suitable for use in surface defect detection, where the powder composition comprises a physical mixture of particles of a colorant and particles of an extender, which mixture includes particles of colorant and particles of extender each having a particle size of less than 100 $\mu$m. The powder compositions of the invention provide a simple, effective guide coat which readily highlights surface imperfections, such as scratches, orange peel effect and dry over-spray without the need for solvents. Also, there are disclosed methods of using such a powder composition to detect surface imperfections, an apparatus for applying same, a device for refilling such applying apparatus, and coated surfaces formed thereby.

13 Claims, 1 Drawing Sheet

SURFACE DEFECT DETECTION POWDER COMPOSITION, METHODS OF USING SAME AND APPLICATION THEREFOR

This application is a Divisional of application Ser. No. 08/542,555, now U.S. Pat. No. 5,721,011, filed Oct. 13, 1995, which application(s) are incorporated herein by reference.

TECHNICAL FIELD

This invention relates to a powder composition for use in the detection of defects on surfaces and to its method of use in surface finishing processes. The invention also relates to an applicator means for dispensing and applying such a powder composition.

BACKGROUND ART

Many surface finishing processes, particularly repair processes in the automotive refinish industry, involve the application of fillers to imperfections in the surface followed by progressive abrasion with coarser to finer abrasive materials until the desired smooth surface is achieved. A series of protective coatings is applied, e.g., primer, paint coats, lacquers and so forth, and each layer is normally rubbed down prior to application of the next coat in order to ensure a smooth surface.

In order to assist the operator in identifying areas requiring abrasion and highlighting defects during the repair process, it is known to apply a guide coat to the surface being treated. The guide coats generally comprises a dilute paint mixture which is sprayed over the surface to be treated to provide a light paint coating. As the surface is abraded the guide coat is removed from the higher portions of the surface leaving the visible guide coat on the lower areas. Thus, the surface irregularities are clearly visible to the operator, enabling him to abrade and fill the appropriate areas.

The use of a dilute paint mixture as a guide coat suffers from the disadvantages that it is necessary to mask surrounding areas of surface which are not to be treated and the use of large amounts of volatile solvent is undesirable.

The present invention, described hereinafter, provides an alternative system for use as a guide coat.

DISCLOSURE OF THE INVENTION

According to the present invention there is provided an adhesive-free, dry, free-flowing powder composition suitable for use in surface defect detection. The inventive-powder composition comprises a physical mixture of particles of a colorant and particles of an extender, which mixture includes particles of colorant and particles of extender each having a particle size of less than 100 μm.

The powder compositions of the invention provide a simple, effective guide coat which readily highlights surface imperfections, such as scratches, orange peel effect and dry over-spray. The compositions do not require the presence of solvents and therefore there is no drying time and the surface may be abraded immediately after application of the guide coat. Furthermore, it has been found that many powder compositions of the invention can substantially reduce the abrading time compared to the use of a guide coat formed by a dilute paint mixture.

BEST MODE FOR CARRYING OUT THE INVENTION

Figure 1:
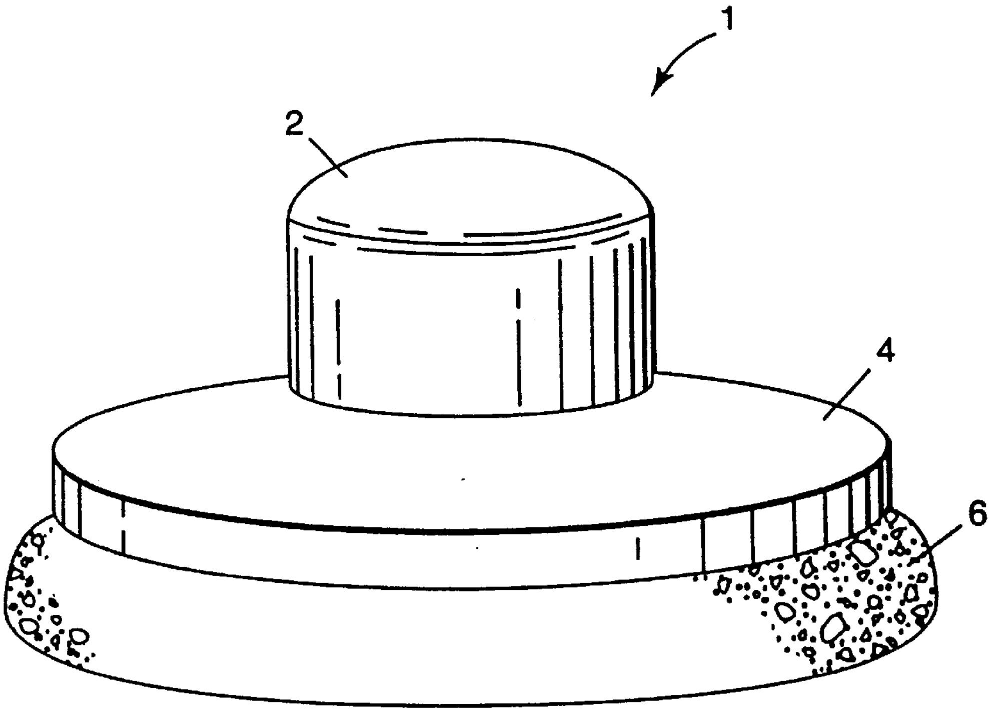
FIG. 1 represents a perspective view of an applicator for a powder composition in accordance with the invention.

The powder compositions of the invention are free from adhesive, thereby readily allowing the composition to be distributed readily over a large surface area.

Generally, at least 50%, preferably at least 90% by weight of the particles of the powder composition have a nonzero particle size of less than 100 μm, in order to reveal defects in a surface having dimensions up to 100 μm. Preferably the average particle size of all the particles used is less than 40 μm, more preferably substantially all the particles have a particle size less than 40 μm. It is preferred that the compositions contain some particles less than 10 μm in particle size order to reveal fine scratches. More preferably the average particle size of the powder composition, overall, is about 10 μm. In the present invention, by the terminology "particle size", it is meant the greatest cross-sectional diameter of the particle. These particle sizes can be determined by sieve tray screening.

The colorant is selected to contrast with the surface to which the composition will be applied. In principle, any dry, free-flowing colored particles may be used in the compositions of the invention. However, many organic pigments or dyes are not economical and/or do not spread evenly over the surface. Inorganic colorants are preferred, e.g., carbon black, iron oxide, etc. The most preferred colorant is carbon black, particularly activated carbon black. Mixtures of colorant may be employed.

The extender is generally a light-colored particulate material which dilutes the colorant. Suitable extenders include calcium carbonate, titanium dioxide, talc, magnesium stearate, zinc stearate, calcium stearate and aluminium stearate. The preferred extender in terms of economy and performance is calcium carbonate. Mixtures of extenders may be employed.

The morphology of the particles is not believed to be important providing the particles are free-flowing and will spread evenly. The colorant is generally present in an amount of less than 50% by weight of the composition and is preferably in the range to 40% by weight.

A preferred guide coat composition of this invention comprises about 30–40% by weight carbon black(s) (total, if a combination is used) and about 60–70% by weight calcium carbonate. These components are typically mixed in a rotary blender, for example, until a homogeneous powder is produced. One preferred guide coat composition of the present invention is formulated to involve a physical mixture, by weight, of about 3–15% of a high color strength non-activated carbon black with an activated carbon black in combination with an extender. A particularly preferred composition includes about 66% calcium carbonate (e.g., Snowcal™ 30); about 6% of a first type of carbon black (e.g., Raven™ 2000D); and about 28% a second type of carbon black except that it is an activated carbon black (e.g., Chemviron Type C). Snowcal™ 30 calcium carbonate powder can be commercially obtained from Croxton & Garry Ltd., Dorking, Surrey England, and is composed of 96% calcium carbonate, 2.0% silica, 0.1% ferric oxide, 0.2% alumina, and small residue of copper and lead. As to its physical properties, Snowcal™ 30 has a weight medium diameter of 4.6 μm; a specific gravity of 2.7; oil absorption (rub out method) of 15 g/100 g; and the percentage (%) retained on 125 μm sieve is 0.2, % retained on 63 μm sieve is 5.0, and & retained on 45 μm sieve is 12, with the % by weight of particles finer than 2 μm being 30. Raven™ 2000D carbon black powder, which is a high color strength non-activated carbon black, commercially available from Columbia Chemicals Co., Atlanta Ga., USA, has a particle size of 18 nm (i.e., the arithmetic mean particle size as measured by electron microscopy); a surface area of about 200 $m^2/g$; a DBP oil absorption of 70 cc/100 g; and a powder density of 16 lb./$ft^3$ (i.e. $2.57\times10^{-2}$ $g/cm^3$). Chemviron Type C activated carbon black is commercially available from Chemviron Carbon Limited, Southlink Great Britain, and is a powder activated carbon having iodine number of 900 minutes; a moisture content of 2% maximum; an ash content of 14% maximum; a bulk density of 0.3 to 0.7 $g/cm^3$; and a wet screen analysis through 325 US mesh (approximately 44 μm opening size) of 65 to 85%. About 3–15% of a high color strength non-activated carbon black having an average particle size of less than about 25 μm is particularly desirable for use in the compositions of the present invention because the composition appears to adhere better to painted surfaces, but is relatively easy to remove during both wet and dry sanding operations.

Desirable guide coat compositions would include those achieving as many as possible of the following desired characteristics:

- safe to use;
- ready to use (no mixing/preparation);
- clean to use (not messy);
- quick to use (covers the area quickly);
- easy to see on surfaces (must be able to see before and during sanding);
- can be used on all sandable surfaces;
- easy to remove excess;
- over-paintable;
- does not damage;
- heat resistant;
- must not load/clog abrasive;
- low cost;
- must not deleteriously influence sanding time;
- must spread evenly;
- needs to look good once applied;
- easy to remove during sanding; and
- swarf must not-stain the newly sanded surface.

In practice, mixtures of carbon black and chalk of this invention are highly suitable as they fulfill most of these desired properties and are economical as compared with other materials.

The powder composition may be distributed over the surface by any suitable means, e.g., by sprinkling powder onto the surface and spreading with a cloth, pad or sponge. Only small amounts of powder composition are required and it is possible to apply a guide coat to the complete body work of a medium-sized automobile using about 9 grams of powder composition. In practice, the powder composition is generally employed in amounts of from 0.5 to 10 $g/m^2$ based on the amount of colorant and extender having a particle size of less than 100μm.

The powder composition will generally be applied to surfaces to which filler has been applied and/or coated with primer, paint lacquer, and so forth, since these are the stages in the refinish industry where guide coats are generally employed. However, the guide coat compositions may be applied directly to non-treated surfaces if required, e.g., wood, metal, such as steel, plastic, fibre glass, and the like.

The powder composition may be stored and dispensed onto the surface from a bag, sachet or container similar to a salt or pepper shaker. Alternatively, the powder composition may be impregnated within the fibres of a fleece, mop, woven or non-woven fabric, or foam which may be wiped over the surface to deposit the powder. In a further embodiment the powder composition may be contained within the reservoir of an applicator and dispensed when the applicator is wiped over the surface. In another embodiment the powder is stored in a reservoir adapted to accommodate the applicator in order to load the applicator with powder prior to use. It is also possible to apply the powder material in a gas stream.

The invention will now be described with reference to the accompanying drawings of FIGS. 1 and 2.

As illustrated in FIG. 1, the applicator means (1) comprises a handle (2) secured to a back-up pad (4) which supports an applicator pad (6). The handle (2) and back-up pad (4) also can be an integral molded body, such as a single integral element of molded rigid foam. The applicator pad (6) may comprise a mop, fleece or foam. A preferred applicator pad is formed of Caligen™ 4200 polyester polyurethane foam. Preferably the applicator pads are removable from the back-up pad in order that they may be replaced. Any suitable fixing system may be employed such as those commonly used for attaching abrasive paper to the back-up pads of sanding devices. For example, the foam may be coated with a pressure-sensitive adhesive and adhered to the back-up pad. Alternatively the pad may be laminated to brushed nylon on one surface which cooperates with a hook system provided on the surface of the back-up pad. For instance, the applicator can comprise a a layer of molded foam onto which the brushed nylon is laminated to the backside thereof. This brushed nylon, as described above, provides an attachment surface for the hooks of the back-up pad.

In one embodiment of the invention the powder is applied to the applicator pad (6), then applied to a surface, or, the powder is applied directly to the surface to be coated from a separate container.

In a further embodiment of the invention the handle (2) may be hollowed to provide a space for storing a supply of dry guide coat powder. Such a powder storage handle can be associated with a delivery system which will feed powder through the back-up pad (4) and applicator pad to allow application of the powder to a surface. The delivery system may comprise one or more holes through the back-up pad, which may be selectively opened and closed. Alternatively, a feed mechanism such as an Archimedes' screw or a power-assisted mechanism using a spring or compressed gas or propellant may facilitate delivery of the powder from the reservoir to the applicator pad.

In a further embodiment of the invention the applicator pad may be impregnated or loaded with the powder composition and thereafter attached to the back-up pad prior to use.

Figure 2:
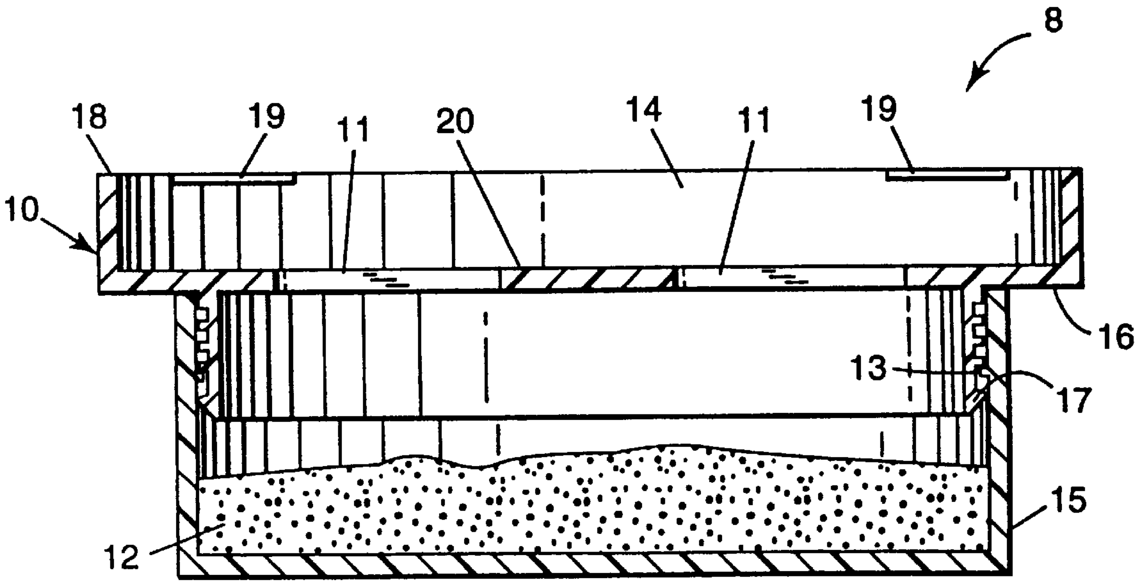
FIG. 2 represents a cross-section through a reservoir of powder composition.

In another embodiment the applicator pad may be loaded with powder prior to use by use of a refill container device as shown in FIG. 2. The refill container (8) comprises two basic components: an applicator pad support and powder delivery element (10) and a removable hollow cap (15) for storage of powder (12). The element (10) can be an integral member of molded rigid plastic comprising an open end (14); a horizontal, circular apertured surface (20) (such as having radial slot openings or channels (11) therethrough) having a horizontal annular flange (16) at its periphery; an upstanding circumferential rim (18) on its front side; and an upstanding circumferential flange (17) on its back side to permit removable attachment of removable cap element (15) which serves as a storage reservoir for refill powder (12). The outside surfaces of such flange (17) are ribbed to allow for interlocking with protrusion (13) provided on the inside wall of cap member (15), to allow these two members to be removably held together and detachable. The rim (18) is dimensioned to accommodate the applicator pad (6) of the applicator therewithin such that the pad may be supported on the horizontal flange (16). Preferably, the rim (18) has a plurality of circumferentially-spaced lugs or inward projections (tabs) (19) provided on the upper end of the rim (18) to assist in retaining an applicator pad during powder refill or handling. These lugs can be spaced equidistantly around the circumference of the rim end surfaces. The horizontal apertured surface (20) extends across the opening to provide additional support for the applicator pad (6). The element (20), alternatively, can be provided as a separate component attached to the upper surfaces of flange 16, such as where the element (20) is mesh or gauze.

The refill device (8) provides a useful support and replacement powder storage device for the applicator which prevents contamination of the applicator pad (6). The applicator pad (6) is readily loaded with powder by simply inverting or shaking the refill device (10) and applicator assembly, as fitted together. The presence of a uniform array of apertures, such as a plurality of radial slots (11) (e.g., radially eminating from a center of surface (20)) or in mesh or gauze, in element (20), assists in uniform loading of the powder over the surface of the applicator pad (6).

In one mode of the refill device of the invention, a removable, non-apertured separator sheet (not shown) can be interposed between surface (20), and a replacement applicator pad itself (not shown) and similar to pad (6) that is prepackaged within and provided as part of the refill device (8) when sold in commerce, so as to prevent powder flow from the cap reservoir into the replacement pad before usage of the refill device.

The powder composition is readily spread over a surface by application of light pressure to wipe the applicator pad over a surface.

The invention will now be illustrated by the following Examples in which all percentages are by weight unless otherwise indicated.

Test Method

Each powder composition was tested on a primed Rover™ 200 bonnet (hood of an automobile) within 24 hours of painting. All work was carried out on a bench with the bonnets in a horizontal plane.

1. Bonnet Preparation

The surfaces were sanded with 3M 255P P180 HOOKIT™ 150 mm diameter, 6 hole discs, one per bonnet, using a D/A 5 mm orbital sander with dust extraction.

The swarf was removed with a solvent wipe.

A two-component "2K" primer, described below, was then applied and cured. The primer used was beige in color and comprised:

3 parts Standox™ 2K HS Filler (Part No. 020 78325), and 1 part Standox™ 2K Hardener for 2K Filler (Part No. 020 82594);

each commercially available from Herberts, Essex, United Kingdom.

2. Guide Coat Application

| | |
|---|---|
| Powder: | 1 gram was sprinkled onto the surface and wiped over by hand with a foam pad. |
| Aerosol: | A light coating of paint was applied to the primed surface. |

3. Coating Appearance

The bonnets coated with powder were then compared with that of an aerosol guide coated panel.

4. Sanding

The guide coated surfaces were sanded with 3M 255P P500 HOOKIT™ 150 mm diameter, 6 hole discs, one per bonnet, using a D/A 5 mm orbital sander with dust extraction until a visually uniform sanded surface was attained. The areas and the time taken to sand were measured and recorded.

EXAMPLE 1-(Comparative)

Sanding Time For Aerosol Guide Coated Panels

An aerosol guide coated bonnet was used as a control. The aerosol paint used was Spectra™ Cellulose Matte Black Spray Paint (Part No. SIMP 17) commercially available from Simoniz International plc, Cornwall, United Kingdom. This product has heretofore been used regularly in United Kingdom body shops as a guide coat. The data from eight experiments on the bonnets were analyzed to establish an overall average sanding time and to give an indication of the deviation of that data from the average. The information can be summarized as follows:

Average Sanding Time per Unit Area 5.82 minutes/$m^2$

Sample Standard Deviation(s) 0.50

These results were used as a control for the following experiments.

EXAMPLE 2

Carbon Black and Calcium Carbonate Powder Guide Coats

The following materials were tested as guide coats:

Carbon black designated product "R2500" commercially available from Columbian Chemicals.

Carbon black designated product "R410" commercially available from Columbian Chemicals.

Carbon black "Type CBX" activated carbon black, wet screen analysis through 325 US mesh (45 μm)=96%, commercially available from Chemviron Carbon Limited.

Carbon black "Type C" a powder activated carbon black, wet screen analysis through 325 US mesh (45 μm)=65 to 85%, commercially available from Chemviron Carbon Limited.

Calcium carbonate, Snowcal™ 20 commercially available from Croxton & Garry Limited, median diameter 4.6 μm, percentage retained on 45 μm sieve=12% by wt.

Calcium carbonate, Snowcal™ 30 commercially available from Croxton & Garry Limited, median diameter 4.6 μm, percentage retained on 45 μm sieve=12% by wt.

Calcium carbonate, Snowcal™ 60 commercially available from Croxton & Garry Limited, median diameter 2.8 μm, percentage retained on 45 μm sieve=0.02% by wt.

The following 31 different guide coat compositions summarized in Table 1 were prepared by mixing the indicated proportions (in wt. %) of each of carbon black and calcium carbonate. The guide coat compositions summarized in Table 1 were prepared, where, for each composition, the amount by weight % of carbon black contained is indicated in the left-hand column and the amount by weight % of calcium carbonate contained therewith is indicated in the adjacent right-hand column.

TABLE 1

| Carbon Black | Calcium Carbonate |
|---|---|
| 5% R2500 | 95% Snowcal ® 20 |
| 7% R2500 | 93% Snowcal ® 20 |
| 11% R2500 | 89% Snowcal ® 20 |
| 10% R2500 | 90% Snowcal ® 20 |
| 10% R2500 | 90% Snowcal ® 20 |
| 15% R2500 | 85% Snowcal ® 20 |
| 20% R2500 | 80% Snowcal ® 20 |
| 20% R21500 | 80% Snowcal ® 20 |
| 30% R2500 | 70% Snowcal ® 20 |
| 35% R2500 | 65% Snowcal ® 20 |
| 5% R410 | 95% Snowcal ® 20 |
| 10% R410 | 90% Snowcal ® 20 |
| 15% R410 | 85% Snowcal ® 20 |
| 20% R410 | 80% Snowcal ® 20 |
| 25% R410 | 75% Snowcal ® 20 |
| 27% R410 | 73% Snowcal ® 20 |
| 35% R410 | 65% Snowcal ® 20 |
| 25% Type CBX | 75% Snowcal ® 20 |
| 30% Type CBX | 70% Snowcal ® 20 |
| 30% Type CBX | 70% Snowcal ® 20 |
| 30% Type CBX | 70% Snowcal ® 30 |
| 30% Type CBX | 70% Snowcal ® 60 |
| 32.5% Type CBX | 67.5% Snowcal ® 20 |
| 35% Type CBX | 65% Snowcal ® 20 |
| 35% Type CBX | 65% Snowcal ® 20 |
| 37.5% Type CBX | 62.5% Snowcal ® 20 |
| 42.5% Type CBX | 57.5% Snowcal ® 20 |
| 45% Type CBX | 55% Snowcal ® 20 |
| 30% Type C | 70% Snowcal ® 20 |
| 30% Type C 70% Snowcal ® 30 | |
| 30% Type C | 70% Snowcal ® 60 |

The guide coat compositions described above in Table 1 were evaluated by the test method described above. All of the above compositions proved to be acceptable as guide coats having a sanding time per unit area in the range 3.5 to 5 minutes, which is less than the average time required using conventional aerosol paint as a guide coat.

Compositions having higher carbon black content were darker but provided no obvious advantage in terms of sanding time. Activated carbon black was more effective than non-activated carbon black. Composition comprising to 40% by weight carbon black are preferred in terms of acceptable performance and economy.

The sanding performance of five dry powder guide coat systems was compared with a black aerosol guide coat using the above test method. The powders for each test powder sample of this example comprised 30% by weight carbon black and 70% by weight calcium carbonate. The results are indicated in Table 2.

TABLE 2

| Black Guide Coats | Sanding Time Per Unit Area (minutes/$m^2$) |
|---|---|
| Type CBX/Snowcal ™ 20 | 4.34 |
| Type CBX/Snowcal ™ 60 | 4.36 |
| Type C/Snowcal ™ 20 | 4.45 |

TABLE 2-continued

| Black Guide Coats | Sanding Time Per Unit Area (minutes/$m^2$) |
|---|---|
| Type C/Snowcal ™ 30 | 3.63 |
| Type C/Snowcal ™ 60 | 3.56 |
| Simoniz, Aerosol (control) | 5.82 |

EXAMPLE 3 (Comparative)

Powder Paint Evaluations

This experiment investigated whether powder paints, in the form of the water dispersible products currently available in many retail stores, would be suitable as guide coats. The black powder paints used generally comprise a mix of pigment (carbon black), adhesive (starch) and filler (calcium carbonate); their proportions vary depending upon their end use and the manufacturer. Black powder paints from the Early Learning Centre (ELC), Calder Colours and Partners were used. The test method described above was again used. The results are summarized in Table 3.

TABLE 3

| Black Guide Coats | Sanding Time Per Unit Area (minutes/$m^2$) | Application Comments | Sanding Comments |
|---|---|---|---|
| ELC, Powder | 6.06 | too dark, streaky coating | swarf stains, marks left on paint |
| Calder, Playgroup Powder | 6.16 | too dark, streaky coating | swarf stains, marks left on paint |
| Calder, Art Powder | 5.79 | too dark, streaky coating | swarf stains, marks left on paint |
| Partners, Powder | 6.29 | too dark, streaky coating | swarf stains, marks left on paint |

The appearance of the bonnets coated with the powder paints were unacceptable when compared with the aerosol spray paint guide coated bonnet. The coatings were too dark and very streaky.

The swarf created while sanding the bonnets coated with the powder paints stained the newly sanded surfaces. All the bonnets coated with the powder paints took longer to sand than the aerosol spray paint guide coated bonnet.

EXAMPLE 4

Comparison of Different Powders

The following powders were tested as guide coats:

Carbon Black Type C;

Snowcal™ 20;

Talc;

30% Carbon Black Type MT, 70% Snowcal™ 20;

30% Carbon Black Type C, 70% Talc;

30% Carbon Black Type C, 70% Magnesium Stearate;

30% Carbon Black Type C, 70% Stearic Acid;

30& Carbon Black Type C, 70% Titanium Dioxide;

30% Carbon Black Type C, 70% Zinc Stearate 30%;

Carbon Black Type C, 70% Calcium Stearate 30%; and

Carbon Black Type C, 70% Aluminium Stearate.

In Table 4, the results observed upon subjecting each of the above powder formulations to the test method are summarized. The mixing proportions, if any, as described above for the various powder formulations studied for this example, are omitted from Table 4 merely for the sake of brevity.

TABLE 4

| Guide Coats | Sanding Time per Unit Area (minutes/$m^2$) | Comments |
|---|---|---|
| Type C | 4.80 | too dark, streaky |
| Snowcal ® 20 | ~3.8 | too light, difficult to evaluate |
| Talc | ~3.62 | too light, difficult to evalulate |
| Type MT/Snowcal ® 20 | 3.76 | |
| Type C/Talc | 3.80 | difficult to evaluate |
| Type C/Stearic Acid | 5.9 | forms spheres on surface |
| Type C/$TiO_2$ | 4.0 | |
| Type C/Zn Stearate | 4.5 | |
| Type C/Ca Stearate | 4.2 | |
| Type C/Al Stearate | 5.9 | |

All the powder guide coated panels sanded faster than the aerosol spray paint guide coated panel.

It was difficult to decide whether the bonnet coated with Snowcal™ 20 and the bonnet coated with talc were completely sanded as their coatings were almost invisible. Defects were undetectable on the bonnets coated with Snowcal™ 20 and talc, the powders were unable to highlight them.

Whilst talc, $TiO_2$ and stearates may be used as extenders they do not appear to offer advantages over calcium carbonate.

EXAMPLE 5

Colored Guide Coats

Tests were conducted using compositions consisting of 30% colorant and 70% Snowcal™ 30 (by wt.), with the colorant changed as indicated in the following descriptions of the compositions studied:

The colorants each used with 70% Snowcal™ 30 were:

Sico Red L3750, an organic colorant commercially available from BASF.

Milori Blue L6697, an inorganic colorant commercially available from BASF.

Heliogen Blue L6920 a phthalocyanine commercially available from BASF.

Calder Colours Green Art Powder Paint and iron oxide red, Bayferrox 120 commercially available from BASF. The powders were subjected to the above test method and the results are summarized in Table 5.

TABLE 5

| Guide Coat | Sanding Time per Unit Area (minutes/$m^2$) | Comments |
|---|---|---|
| Sico Red/Snowcal ™ 30 | 6.8 | too dark |
| Heliogen Blue/Snowcal ™ 30 | 7.0 | too dark, swarf stains |
| Green Art Powder/Snowcal ™ 30 | ~3.8 | too light, difficult to evaluate |
| Red Iron oxide/Snowcal ™ 30 | 4.8 | dark |
| Milori Blue/Snowcal ™ 30 | 5.9 | too dark, swarf stains |
| Simoniz, Aerosol. (control) | 5.82 | |

Whilst all the guide compositions were useful to some degree, the colorants tested did not appear to be optimal as compared to carbon black. Iron oxide was the best alternative to carbon black.

What is claimed is:

1. An adhesive-free, dry, free-flowing powder composition suitable for use in surface defect detection consisting essentially of particles of a colorant selected from the group consisting of carbon black and iron oxide and particles of an extender selected from the group consisting of calcium carbonate, titanium dioxide, talc, magnesium stearate, zinc stearate, calcium stearate and aluminum stearate, said particles of colorant and said particles of extender each include fine particles having a particle size of less than 100 $\mu$m.

2. A composition as claimed in claim 1 in which at least 50% by weight of all said particles of colorant and extender have a particle size of less than 100 $\mu$m.

3. A composition as claimed in claim 1 in which the average particle size of all said particles is less than 40 $\mu$m.

4. A composition as claimed in claim 3 in which substantially all of said fine particles have a particle size less than 40 $\mu$m.

5. A composition as claimed in claim 1 which comprises fine particles having a particle size less than 10 $\mu$m.

6. A composition as claimed in claim 1 having an average particle size of approximately 10 $\mu$m.

7. A composition as claimed in claim 1 in which the colorant comprises activated carbon black.

8. A composition as claimed in claim 1 in which said extender comprises calcium carbonate.

9. A composition as claimed in claim 1 in which said colorant is present in an amount of less than 50% by weight of the total weight of said composition.

10. A composition as claimed in claim 9 in which said colorant comprises a mixture of two types of carbon black.

11. A composition as claimed in claim 10 in which one of said types of carbon black is an activated carbon black.

12. A composition as claimed in claim 1 consisting essentially of from about 25% to about 40% by weight carbon black and from about 60% to about 75% by weight of calcium carbonate.

13. A compositions as claimed in claim 12 consisting essentially of about 28% activated carbon black, about 6% non-activated carbon black, and about 66% by weight of calcium carbonate.

* * * * *

UNITED STATES PATENT AND TRADEMARK OFFICE

CERTIFICATE OF CORRECTION

PATENT NO. : 6,083,316
DATED : July 4, 2000

INVENTOR(S) : Bastow, David R.

It is certified that error appears in the above-identified patent and that said Letters Patent is hereby corrected as shown below:

<u>Column 7,</u>
Table 1, under the Carbon Black column, delete "20% R21500" and insert in place thereof -- 20% R2500 --
Table 1, under the Carbon Black column, move "70% Snowcal ® 30" to the Calcium Carbonate column
Line 50, "Composition comprising to" should be -- Composition comprising 25% to --

Signed and Sealed this

Twenty-eighth Day of October, 2003

JAMES E. ROGAN
*Director of the United States Patent and Trademark Office*